United States Patent
Scott et al.

(10) Patent No.: US 8,457,971 B2
(45) Date of Patent: *Jun. 4, 2013

(54) METHOD AND APPARATUS FOR ANALYZING DISCUSSION REGARDING MEDIA PROGRAMS

(75) Inventors: Charles Scott, Austin, TX (US); Scott White, Austin, TX (US); Ankur Mukerji, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/594,323

(22) Filed: Aug. 24, 2012

(65) Prior Publication Data

US 2012/0324498 A1 Dec. 20, 2012

Related U.S. Application Data (63) Continuation of application No. 12/399,694, filed on Mar. 6, 2009, now Pat. No. 8,275,623.

(51) Int. Cl.
*G10L 15/00* (2006.01)
(52) U.S. Cl.
USPC .......................................... 704/270; 704/235
(58) Field of Classification Search
None
See application file for complete search history.

(56) References Cited

U.S. PATENT DOCUMENTS

| | | | |
|---|---|---|---|
| 5,223,924 A | 6/1993 | Strubbe | |
| 5,920,694 A | 7/1999 | Carleton et al. | |
| 6,100,882 A | 8/2000 | Sharman et al. | |
| 6,272,231 B1 | 8/2001 | Maurer et al. | |
| 6,345,389 B1 | 2/2002 | Dureau | |
| 6,357,042 B2 | 3/2002 | Srinivasan et al. | |
| 6,438,579 B1 | 8/2002 | Hosken | |
| 6,567,797 B1 | 5/2003 | Schuetze et al. | |
| 6,580,811 B2 | 6/2003 | Maurer et al. | |
| 6,732,146 B1 | 5/2004 | Miyake | |
| 6,792,412 B1 | 9/2004 | Sullivan et al. | |
| 6,948,131 B1 | 9/2005 | Neven et al. | |
| 7,031,931 B1 | 4/2006 | Meyers | |
| 7,051,352 B1 | 5/2006 | Schaffer | |
| 7,133,828 B2 | 11/2006 | Scarano et al. | |
| 7,526,458 B2 | 4/2009 | Flinn et al. | |
| 8,005,680 B2 | 8/2011 | Kommer | |
| 8,046,797 B2 | 10/2011 | Bentolila et al. | |
| 2002/0010759 A1 | 1/2002 | Hitson et al. | |
| 2002/0059094 A1 | 5/2002 | Hosea et al. | |
| 2002/0097265 A1 | 7/2002 | Kurapati et al. | |
| 2002/0162107 A1 | 10/2002 | Gutta et al. | |
| 2002/0178057 A1 | 11/2002 | Bertram et al. | |
| 2002/0193066 A1 | 12/2002 | Connelly | |
| 2002/0194586 A1 | 12/2002 | Gutta et al. | |
| 2002/0199194 A1 | 12/2002 | Ali | |
| 2003/0066068 A1 | 4/2003 | Gutta et al. | |

(Continued)

*Primary Examiner* — Talivaldis Ivars Smits
(74) *Attorney, Agent, or Firm* — Guntin & Gust, PLC; Ralph Trementozzi (57) ABSTRACT

A system that incorporates teachings of the present disclosure may include, for example, a device including a controller to detect a plurality of users engaging in a voice conference related to a presentation of a media program, convert speech dialog detected in the voice conference to textual dialog, detect from the textual dialog a behavioral profile of at least one of the plurality of users, and identify at least one of advertisement content and marketable media content based on the behavioral profile of the at least one user. Other embodiments are disclosed.

20 Claims, 8 Drawing Sheets

U.S. PATENT DOCUMENTS

| | | |
|---|---|---|
| 2003/0101450 A1 | 5/2003 | Davidsson et al. |
| 2003/0234805 A1 | 12/2003 | Toyama et al. |
| 2004/0003392 A1 | 1/2004 | Trajkovic et al. |
| 2004/0064526 A1 | 4/2004 | Lee et al. |
| 2005/0120391 A1 | 6/2005 | Haynie et al. |
| 2005/0131918 A1 | 6/2005 | Hillis et al. |
| 2005/0132420 A1 | 6/2005 | Howard et al. |
| 2005/0144632 A1 | 6/2005 | Mears et al. |
| 2005/0149974 A1 | 7/2005 | Norman |
| 2005/0262542 A1 | 11/2005 | DeWeese et al. |
| 2006/0020614 A1 | 1/2006 | Kolawa et al. |
| 2006/0026502 A1 | 2/2006 | Dutta |
| 2006/0168150 A1 | 7/2006 | Naik et al. |
| 2006/0190966 A1 | 8/2006 | McKissick et al. |
| 2006/0218481 A1 | 9/2006 | Adams Jr. et al. |
| 2006/0259355 A1 | 11/2006 | Farouki et al. |
| 2006/0271997 A1 | 11/2006 | Jacoby et al. |
| 2006/0288041 A1 | 12/2006 | Plastina et al. |
| 2007/0011039 A1 | 1/2007 | Oddo |
| 2007/0208564 A1 | 9/2007 | Tran |
| 2008/0091518 A1 | 4/2008 | Eisenson et al. |
| 2009/0204664 A1 | 8/2009 | Yovin et al. |
| 2010/0162284 A1 | 6/2010 | Robbins et al. |

METHOD AND APPARATUS FOR ANALYZING DISCUSSION REGARDING MEDIA PROGRAMS

CROSS-REFERENCE TO RELATED APPLICATIONS

This application is a continuation of U.S. patent application Ser. No. 12/399,694 filed Mar. 6, 2009 which is incorporated herein by reference in its entirety.

FIELD OF THE DISCLOSURE

The present disclosure relates generally to media presentation techniques and more specifically to a method and apparatus for analyzing discussion content regarding media programs.

BACKGROUND

As advances in technology have dramatically risen in recent years, consumers can now enjoy media content through a variety of means. Consumers can experience media content through analog and digital televisions, set-top boxes, Internet Protocol Television (IPTV) systems, satellite television systems, cable systems, and other media systems. The media broadcast through such systems can include audio, video, text, and/or images or combinations thereof.

Although consumers can experience and interact with media content in multiple ways on their own, enjoying such media content with others often provides a different and often times more interesting experience than experiencing the media content alone. People often resort to inviting friends over to watch a media program or to getting together to experience a program at a place such as a movie theater.

Moreover, it is difficult to know the demographic of consumers of various media content. Advertising, such as, for example, television (TV) advertising, has traditionally been carried out based on generalized age, sex, and income ranges for the entire viewer group of a TV show. In order to determine the appeal of the media program to the user, large sample group polling and target group viewings have been relied upon. However, polling is expensive and may not provide the detailed responses desired. Moreover, target group viewings are also expensive, limited in the number of responses that are used, and do not occur in a user's native viewing/experiential environment.

DETAILED DESCRIPTION

One embodiment of the present disclosure can entail a method including detecting a plurality of users engaging in a voice conference to discuss a presentation of a media program; converting speech dialog detected in the voice conference to textual dialog; detecting from the textual dialog a behavioral pattern of at least one of the plurality of users; and identifying at least one of advertisement content and marketable media content according to the behavioral pattern of the at least one user.

Another embodiment of the present disclosure can entail a device, comprising a controller to detect a plurality of users engaging in a discussion with respect to a presentation of a media program; convert speech dialog detected in the discussion to textual dialog; and identify at least one of advertisement content and marketable media content from the textual dialog.

Yet another embodiment of the present disclosure can entail a computer-readable storage medium comprising computer instructions to detect a voice conference to discuss a presentation of a media program; analyze the textual dialog derived from the voice conference to detect a behavioral pattern of at least one of the plurality of users engaged in the voice conference; and identify at least one of advertisement content and marketing content according to the behavioral pattern of the at least one user.

A still further embodiment of the present disclosure can entail a set-top box, comprising a controller to: detect a plurality of users engaging in a voice conference to discuss a presentation of a media program supplied by an interactive television network; and identify at least one of advertisement content and marketable media content from textual dialog synthesized from the voice conference.

Figure 1:
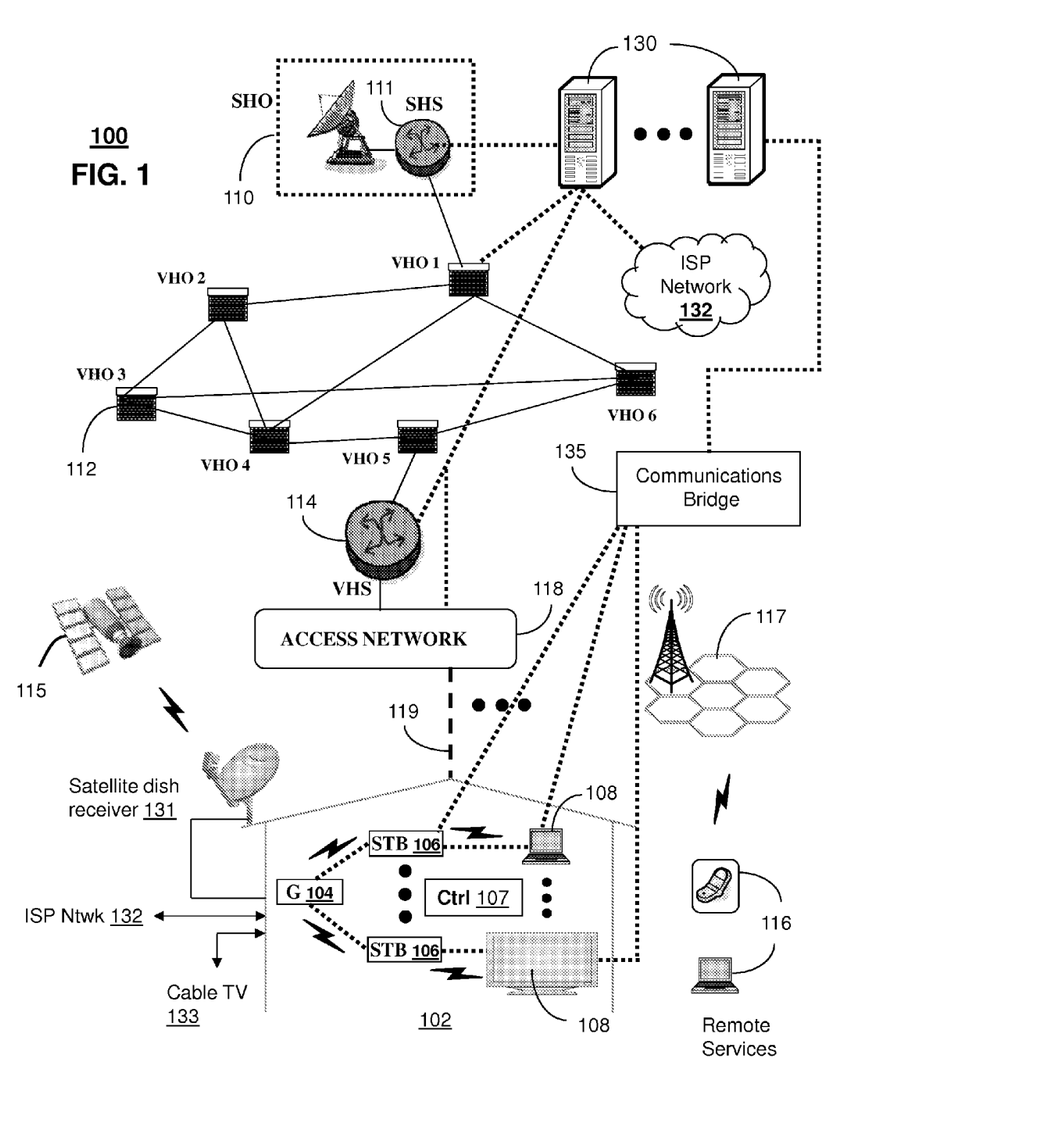
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super head-end office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

In an embodiment, the communication system 100 can also include a communications bridge 135. Notably, the communications bridge 135 can be an audio bridge, video bridge, or other media bridge for performing the operative functions of the present invention. The communications bridge 135 can be operably coupled to the media processors 106, media devices 108, wireless communications devices 116, landline telephones (not explicitly shown), and the computing devices 130 and can be utilized to interconnect the various devices. Once the devices are connected, media content coming from the devices can be mixed and shared between the devices using the communications bridge 135.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
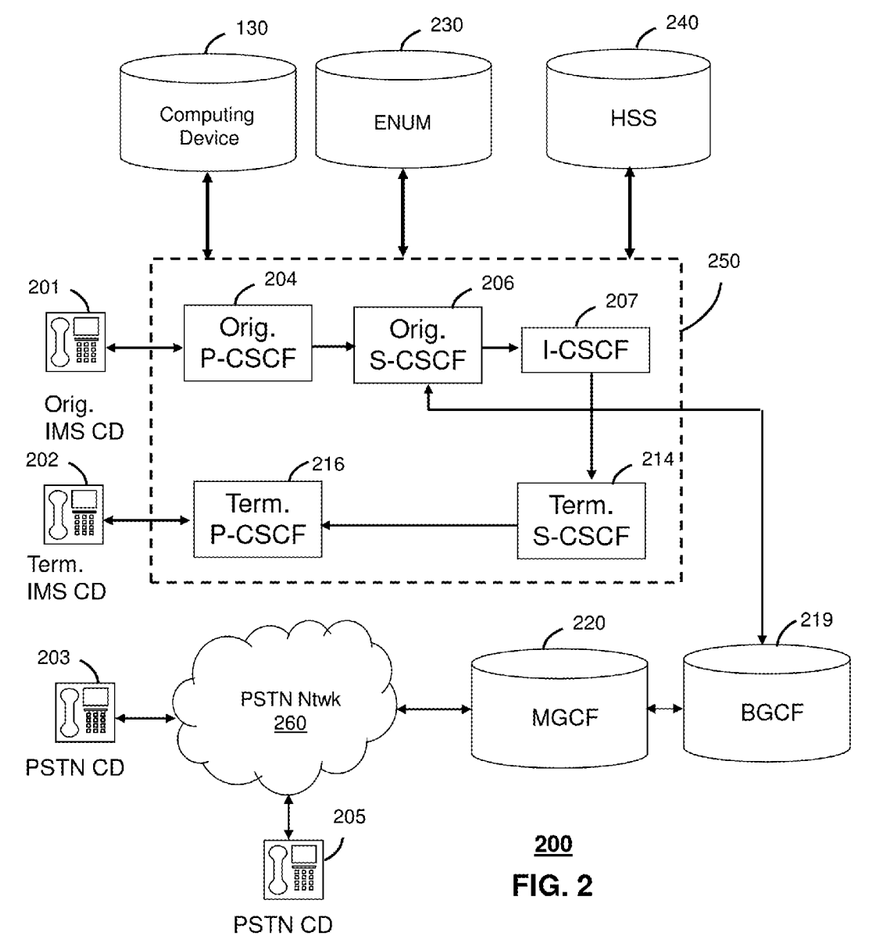

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The computing devices 130 of FIG. 1 can be operably coupled to the second communication system 200 for purposes similar to those described above.

Figure 3:
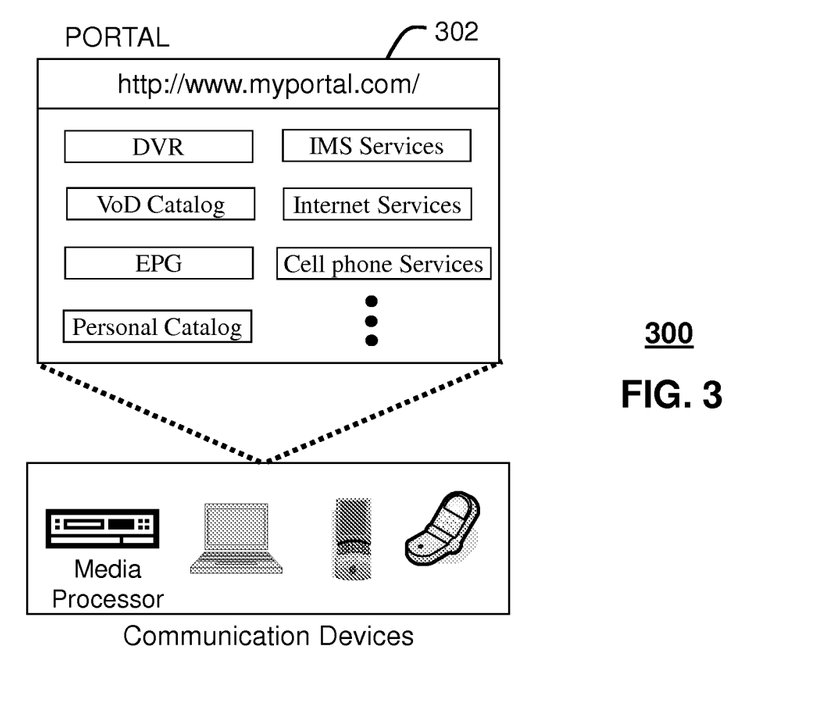
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
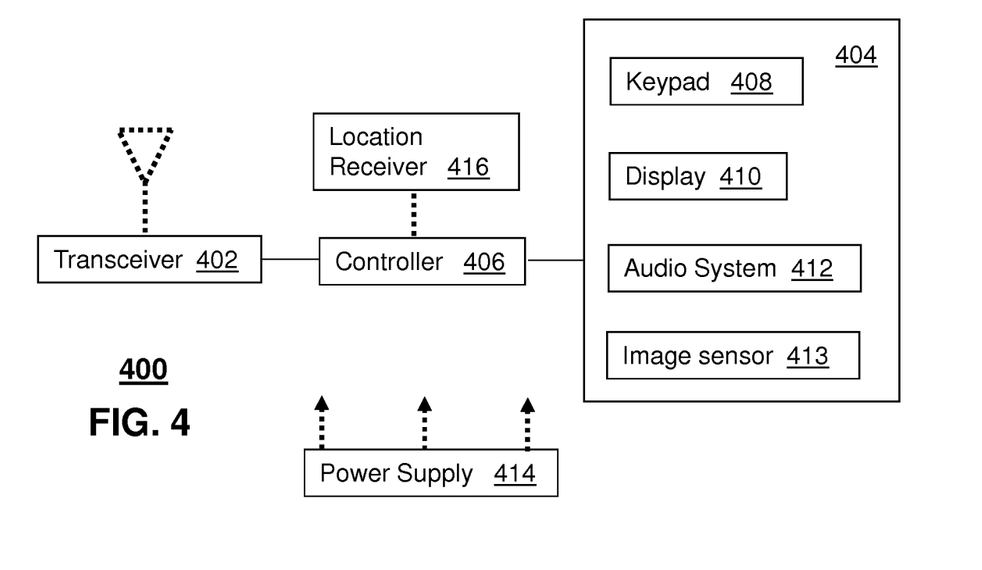
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1×, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
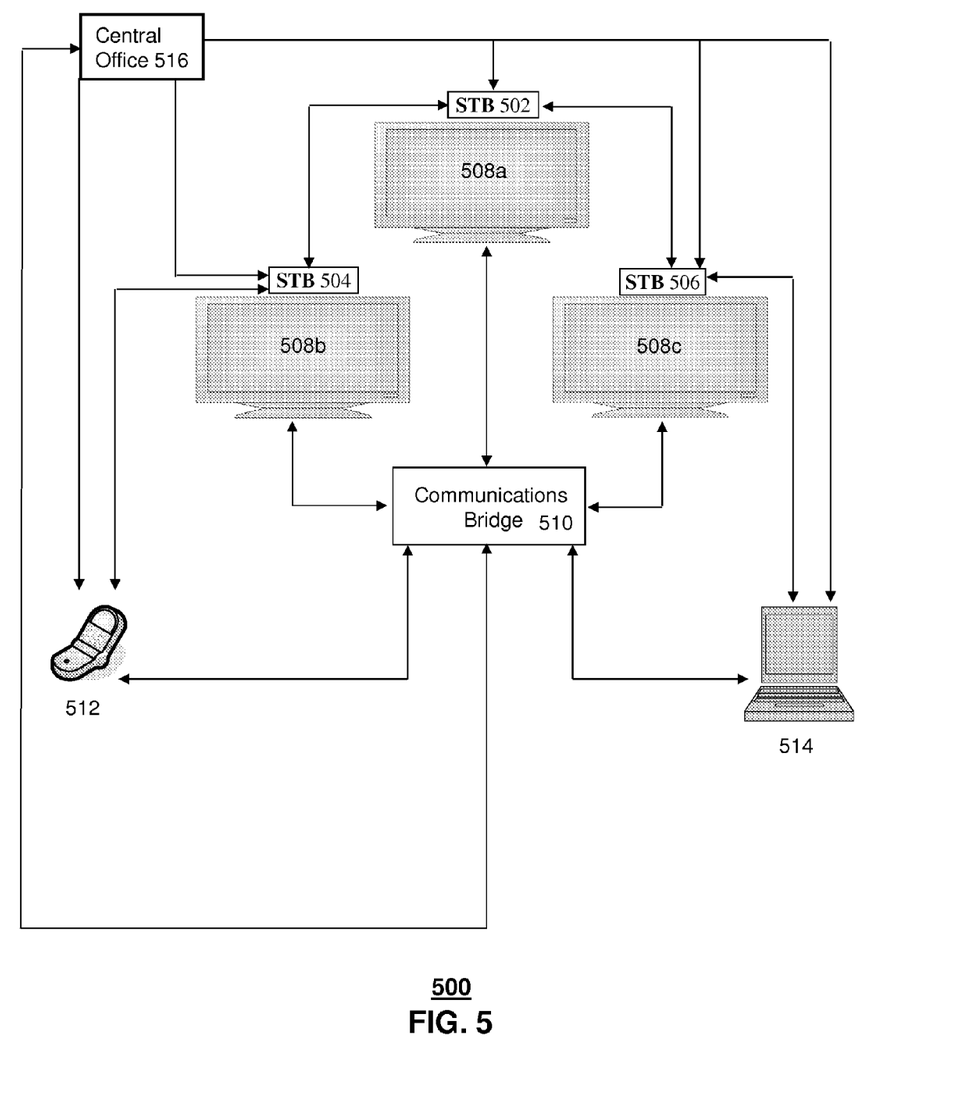
FIG. 5 depicts an illustrative embodiment of a system for providing a group media experience and for analyzing discussion regarding media programs, the system operating in the communications systems of FIGS. 1-2.

FIG. 5 depicts an illustrative embodiment of a system 500 for providing a group media experience and for analyzing discussion regarding media programs, the system 500 being operable in portions of the communications systems of FIGS. 1-2. The system 500 can include one or more set-top boxes 502, 504, and 506, which can be configured to deliver media content to media devices 508a-c, communications device 512, and computing device 514. The media devices can include any device capable of displaying and/or playing media content such as televisions, cellular phones, personal digital assistants (PDA), computers, and the like. The communications device 512 can include, for example, a mobile device, a cellular phone, wireless device, or other communications device and the computing device 514 can be a computer or laptop.

Additionally, the system 500 can include a communications bridge 510, which can be utilized to communicatively link the set-top boxes 502, 504, and 506, media devices 508a-c communications device 512, computing device 514, or a combination thereof in the system 500 to a media conference. Notably, the communications bridge 510 can be integrated as part of any of the devices in the system 500 and/or integrated as part of a central office 516. However, the communications bridge 510 can also be a stand alone device. The media conference can include, for example, a media program and video, image, voice, synthesized speech to text communications and text communications. The devices can be connected to the communications bridge 510, where the bridge can receive and mix media content coming from each of the devices and then share the received media content with each device participating in the media conference. The media content coming from the communications bridge 510 can be transmitted synchronously with other media content and programming, which can be transmitted from a central office 516 or other media source to the devices for presentation.

Figure 6:
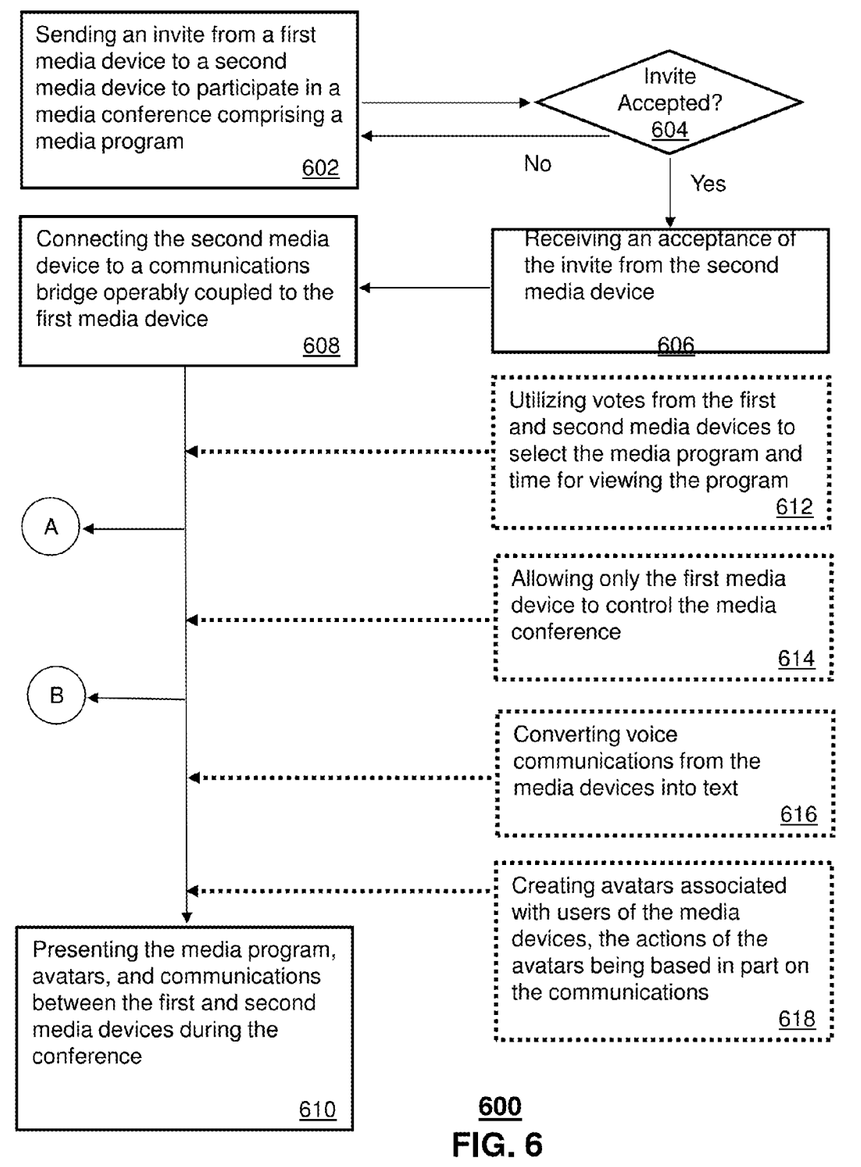
FIG. 6 depicts an illustrative embodiment of a method operating in portions of the communication systems of FIGS. 1-2.

FIG. 6 depicts an illustrative method 600 that operates in portions of the communication systems of FIGS. 1-2 and FIG. 5. Method 600 can begin with step 602 in which a device, such as STB 502, communications device 512, and computing device 514, can send an invite to one or more other devices, such as STBs 504 and 506, to participate in a media conference. As mentioned above, the media conference can include a media program and voice, video, image, synthesized text to speech communications and text communications. For example, a user using STB 502 and television 508a may want to watch and experience a particular television show with his friends without having to meet up with his friends or having to be in the same vicinity with them. In order to do so, the user of STB 502 can arrange a media conference with his friends, while being able to stay in the comfort of his current location. The user of STB 502 can arrange the media conference by selectively choosing which users he wants to participate in the media conference from a list of users, which can be maintained in STB 502 or any other component in the system 500. The invites can be directly initiated and sent by the STB 502 or by using a remote control (not explicitly shown) communicatively linked to the STB 502 to the users associated with STBs 504 and 506.

In an embodiment, the invite can be initiated from an EPG. For example, the user of set-top box 502 can select a particular show from the EPG and can select an option "Invite Group" from a menu. By selecting the option, the user can initiate the sending of invites to whomever he wants to participate in the media program with him The selected users can be auto-dialed or otherwise notified, including by way of various types of communication devices, so that they can be added to the media conference. The media conference itself can be supported by the use of conferencing equipment such as communications bridge 510, which can be a video bridge, audio bridge, or a combination thereof. Also, the communications bridge 510 can include a VoIP or telephone bridge.

At step 604, the users of STBs 504 and 506 can decide whether or not they would like to accept their respective invites. They can accept an invite, for example, by selecting a button on their respective remote controls, using STBs 504 and 506, selecting an option in the EPG, or through other means and devices. The acceptances and/or rejections of the invitations can be received by STB 502 at step 606. Once the acceptances have been received, STBs 504 and 506 can be communicatively linked to the user of STB 502 via communications bridge 510 at step 608. Users not accepting the invitation might not be added to the communications bridge 510. After the STBs 502, 504, and 506 (assuming both invitees accepted) have been linked together, the media program can be initiated and presented to the users at step 610. In the embodiment utilizing the EPG, an option can be selected from the EPG to use the communications bridge 510 and any users accepting invitations can be displayed in a lobby interface associated with the EPG.

The media program can be delivered to the STBs 502, 504, and 506 by the central office 516. Additionally, the media program itself can be supplied by the central office 516 or other distribution means using an iTV network, which can be in the form of IPTV, interactive cable television, and/or interactive satellite television. The media program can be comprised of, but is not limited to, audio content, video content, image content, gaming content, and/or text content. The users can input voice communications via a microphone operably coupled to a remote control, embedded microphones in STBs 502, 504, and 506, media devices 508a-c, communications device 512, and computing device 514.

Voice communications or other communications coming from the users connected to communications bridge 510 can be transmitted and/or presented synchronously or asynchronously with the media program at step 610. For example, if the user of STB 502 starts a football game program, any commentary and reactions coming from all the users linked to the communications bridge 510 can be heard synchronously with the football program. By enabling commentary and reactions to be heard synchronously with the media program, it can significantly impact the appreciation of the media program for all of the users participating in the media conference.

According to one embodiment, the users of STBs 502, 504, and 506 can utilize votes to select which media program they want to watch and what time slot the media program is to be presented at step 612. Each user can use their respective STBs 502, 504, and 506 to make their votes. Signals indicating their votes can be sent to each STB 502, 504, and 506 and the votes can be tallied by any of the STBs. For example, if the users of STBs 502 and 504 vote to watch a football program at 5:00 p.m. and the user of STB 506 votes for a different TV show at a different time slot, the football program will be presented during the media conference at 5:00 pm. If the user STB 506 is not happy with results of the vote, he can revoke his acceptance of the invite and disconnect from the communications bridge 510. If a particular time slot is scheduled, a reminder can be sent to one or more of the STBs 502, 504, and 506 indicating that the scheduled media conference start time is approaching. When the scheduled time arrives, a user can start the media conference and media program using their STB, an EPG, a remote control, or other device.

In another embodiment, the user initiating the media conference can be the only user allowed to control the media conference at step 614. The initiating user can serve as the media conference leader and can be the only one allowed to start and schedule the media program, control playback (such as pause, rewind, fast forward, play functions on a STB), or perform other operative functions associated with the media conference. In the preceding example, the user of STB 502 started the media conference so he can set the time for the media conference to start, the time for the media program to start playing, the total number of users participating in the conference, and which users actually get to participate in the conference.

In another embodiment, any voice communications coming into the communications bridge 510 can be converted into text communications at step 616. The conversion of the speech into text can be performed by the STBs 502, 504, and 506, communications bridge 510, the central office 516, or any of the other operative devices in system 500. The converted text communications can be displayed on the media devices 508a-c, the communications device 512 and/or the computing device 514. Also, a user identifier can be included with the text communications to indicate which user contributed the communications to the media conference.

The STBs 502, 504, and 506 and other components in the system 500 can also be configured to detect voice communications in the vicinity of the device making the detection. For example, if the initiating device is STB 502 and voice communications are generated at STB 502, then STB 502 can submit to the other devices connected to the communications bridge 510 an identifier and detected voice communications and/or synthesized text derived from the detected voice communications. The identifier can indicate that the voice communications came from the user using STB 502.

For voice communications originating from a device other than the initiating STB 502, the initiating STB 502 can receive an identifier and voice communications and/or synthesized text derived from the voice communications from the other device. The identifier in this case can indicate that the voice communications came from the user using the other device, such as STB 504. The identifiers and/or a derivative of the identifiers can be presented with the voice communications, text synthesized by an STB from the received voice communications, and/or the synthesized text supplied by the other device. A derivative of an identifier can, for example, be a code, which can be translated into a character string and sent to the other devices connected to the communications bridge 510.

In an example, if the user of STB 502 says, "This game is awesome," the speech can be converted by the STB 502 into text, and the text and a user identification (such as "Tony") of the user can be transmitted to STBs 504 and 506. The STB of the user making the speech/voice communications does not have to perform the speech-to-text conversion. The STB 502 can send the unconverted audio and the user identification of the user to STBs 504 and 506, and STB 504 and/or STB 506 can perform the conversion. Regardless of which device performs the conversion, at least a portion of the text generated from the converted speech and the user identification of the user who made the speech can be displayed on any of the media devices 508a-c associated with STBs 502, 504, and 506. In an embodiment, if it is so desired, incoming speech can be muted while the text converted from the speech is presented to the users. Such a feature would be particularly useful if everyone involved in the media conference wants to focus on the audio coming from the media program, but still wants to be able to appreciate the comments coming from each user participating in the conference.

At step 618, the method 600 can include creating avatars for any of the users of the STBs 502, 504, and 506 or users of other devices in system 500. Each user can be associated with a particular avatar or avatars. For example, the avatar can be a pictorial representation the user selects, an image of the user, or other identifier capable of identifying who the user is. The avatars can be displayed and presented during the media conference and the presentation can be performed synchronously with the media program and any voice, video, and text communications. The avatars can also have actions associated with them and the actions can be based at least in part on the voice communications and/or text communications coming from the users. As an illustration, if the user of STB 502 is yelling in an excited manner through a microphone, the avatar can move in a manner indicating the excitement of the user. For example, if the avatar is a pictorial representation of a person, the avatar's arms and/or head can wave and move around in excitement. The avatar can respond to pitch, intensity, volume, stress, and other voice-related metrics as well.

Figure 7:
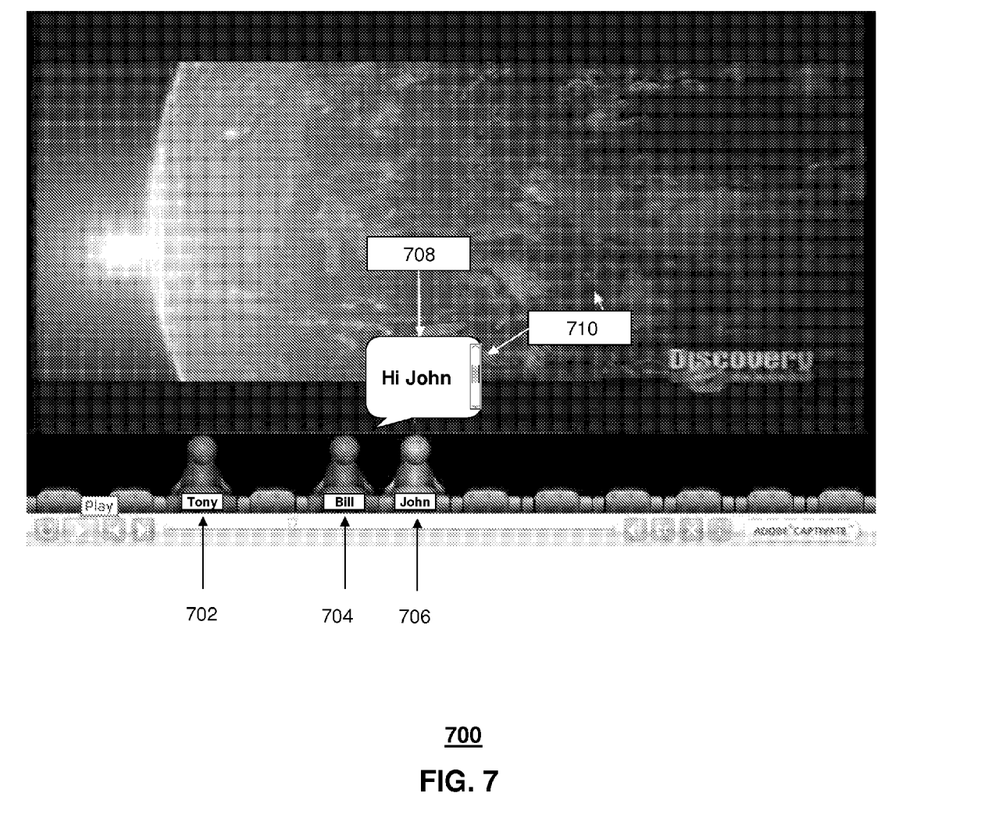
FIG. 7 depicts an embodiment illustrating the use of avatars in a group media experience.

Referring now also to FIG. 7, an illustration of a display 700 depicting the use of avatars is shown. The display 700 can include avatars 702, 704, and 706, which are used to represent users connected to a media conference. As shown, the users associated with avatars 702, 704, and 706 are Tony, Bill, and John respectively. Bill can say, "Hi John," into a microphone operably coupled to STB 504, and STB 504 can convert his speech into text. The text can then be displayed in a call-out box 708, while also playing the audio of his speech as well. However, the users can mute the audio, while continuing to have the text displayed. The call-out box 708 can keep a log of all speech generated by the users during the media conference. Scroll bar 710 can be included with the call-out box 708 so that the users can scroll through all comments generated during the media conference.

In another embodiment, the method 600 can include replacing the avatars associated with the users with actual video, real-time or not, of the users themselves. In FIG. 7, avatars 702, 704, and 706 can be replaced with actual real-time video of the users. The video stream can be presented synchronously with the media program and any voice, text, image, and video communications. If the user of STB 502 starts speaking, his speech can be converted into text and can be presented in a call-out box 708 next to the face of the video representation of the user. The call-out box 708 can also include the scroll bar 710 to scroll through all text generated. As an additional option, the users can mute the audio for the speech and can simply view the text converted from the speech so as not to interfere with the audio of the media program.

The method 600 can also include enabling the users of STBs 502, 504, and 506 to control the communications from the communications bridge 510 independently from the media program. For example, if a user wanted to mute the communications from the communications bridge 510, while continuing to play the audio from the media program, the user could do so using an STB, remote control, or other device. Similarly, the user can mute the audio coming from the media program, while choosing to retain the audio coming from the other users participating in the media conference.

In yet another embodiment, the voice communications coming into the system 500 and which are converted into text communications, can be analyzed and mined to detect behavioral patterns of the users. The behavioral patterns can then be utilized to identify, for example, advertisement content and marketable media content to target the content and customize the content to the particular users.

Figure 8:
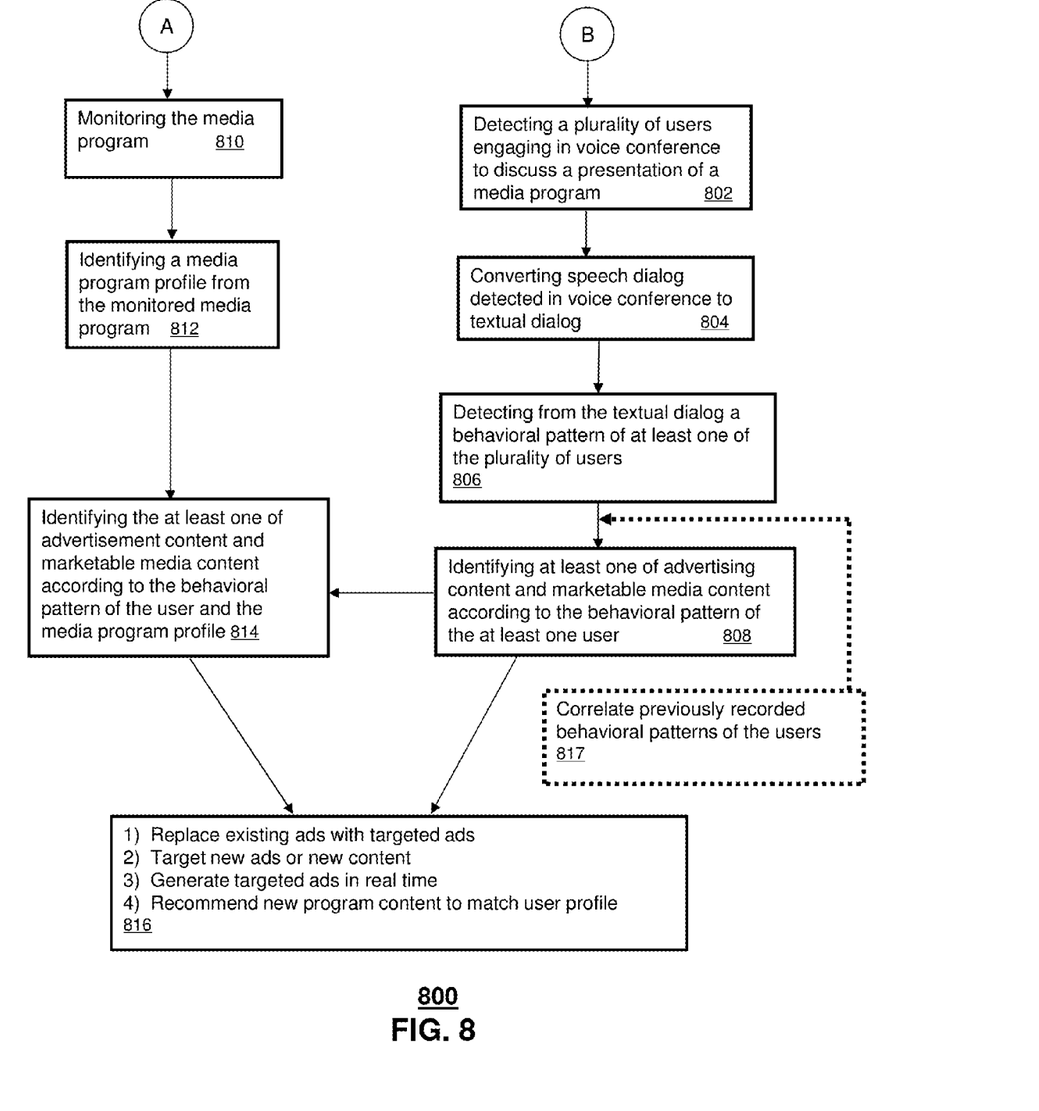
FIG. 8 depicts an illustrative embodiment of a method operating in portions of the communications systems of FIGS. 1-2.

FIG. 8 depicts an illustrative method 800 that operates in portions of the communications systems of FIGS. 1-2 and 5 and in conjunction with the method 600 of FIG. 6. Method 800 can begin with step 802 in which a device, such as STB 502, the other STBs 504 and 506, the communications bridge 510, the central office 516, or any of the other devices in system 500, detects a plurality of users engaging in a voice conference to discuss a presentation of a media program. The plurality of users can be, for example, those users who have accepted the invite in step 604 and are experiencing the media program being presented, such as a football game program, and are providing their commentary and reactions with respect to the media program.

In step 804, the speech dialog detected in the voice conference in step 802 is converted to textual dialog. The conversion of the speech of the various users into textual dialog can be carried out by a speech-to-text algorithm performed by any one of the same devices indicated above with respect to the detecting step 802.

In step 806, the textual dialog of the various users is analyzed to detect various behavioral patterns of the plurality of users. The analysis can be performed by any one of the same devices as indicated above with respect to the detecting step 802 and the conversion step 804. The analyzing step 806 is designed to detect and mine various behavioral patterns based on the commentary and reactions of the users with respect to the media program. Such behavioral patterns may include, but are not limited to, biases, opinions, moods, language, personality, demographics or psychographics. The behavioral pattern may be detected using, for example, at least one of key words, key phrases, or statistical modeling.

In step 808, the system identifies at least one of advertising content and marketable media content according to the behavioral patterns of one or more of the users. The identification can be performed by any one of the same devices as indicated above with respect to the steps 802 through 806.

The system 500 can also monitor the media program (step 810) and identify a media program profile from the monitored media program (step 812). The media program profile may be identified using, for example, metadata. In step 814, at least one of advertisement content and marketable media content can then be identified according to the behavioral patterns of the users from steps 802 through 808 and the media program profile from steps 810 through 812.

From the determinations made in steps 802-808 and/or steps 810-814, in step 816, the system 500 can then 1) replace existing advertisements with advertisements which are targeted to the particular users, 2) target new advertisements and/or new marketing content to the particular users, 3) generate targeted advertisements to the user group in real time based on mined data, 4) promote serial viewing by user(s) by stripping ads and instead pre-appending and/or post-appending targeted advertisement, and/or 5) recommend new program content at the end of the group viewing/media experience that matches the particular user profile.

Replacement of existing advertisements with targeted advertisements may be carried out by stripping unwanted ads and replacing them with targeted ads using metadata that provides demarcation information to identify where the ads are located in the original program. It is also possible to promote serial viewing by users by stripping unwanted ads, and instead pre-appending and post-appending targeted advertisements to improve the viewing experience. Accordingly, for example, if a particular user group is watching a football game and expresses interest in a particular type of automobile, and/or expresses a dislike for a particular automobile, the system 500 can mine this information and strip out any advertisement related to automobiles that the group dislikes, and insert advertisements related to automobiles that the group expresses an interest in, for example, during a break or at the end of the football game.

While the example given above relates to a live football game, the present invention is not limited to this type of media program, and the media program may be pre-recorded, so that the method 800 comprises replacing existing advertisements with targeted advertisements based on the detected behavioral patterns of at least one of the plurality of users.

Moreover, while the above example detects behavioral patterns of the users experiencing a media event in order to target, for example, advertisements, the present invention also contemplates identifying previously recorded behavioral patterns of the users, and then correlating the previously recorded behavioral patterns with the detected behavioral patterns of the users (step 817) to target new advertisements and/or new content to the users.

In another embodiment, the method 800 can search one of an EPG or VoD, or other content databases for additional content of potential interest, and then suggest the additional content to the users.

While the examples refer to targeted advertisements and marketing content being customized to the user group based on detected behavioral patterns or profiles, as noted above, the method 800 also contemplates recommending a new program upon completion of the media program based on a behavioral pattern of least one of the users and the media program profile. Accordingly, the method 800 provides both customized advertising/marketing and recommendations for customized programming for the users based on their detected behavioral patterns or profiles.

Upon reviewing the aforementioned embodiments, it would be evident to an artisan with ordinary skill in the art that said embodiments can be modified, reduced, or enhanced without departing from the scope and spirit of the claims described below. For example, the methods 600 and 800 can include allowing the users participating in the conference to rate the media programs, provide preferences, and create user profiles. The users can also input demographic information and psychographic information. Also, the voice communications or text communications coming from the users can be utilized and screened by the devices in the system 500. The information about the users can be stored and maintained by any of the devices in the system 500 and can then be used to create buddy lists tailored to the users viewing interests, demographics, commentary, and the like. The tailored buddy lists can be used by a user to automatically select and invite a group of users to a media conference and customize advertisements and marketing content to that particular group of users, because the selected users would be more likely to enjoy or provide meaningful commentary for a particular media program, as well as enjoy the customized advertising and marking content.

In an embodiment, the media program presented during the media conference can be recorded media content. This can allow users to schedule a media conference to watch programs that were previously broadcasted. For example, if a particular show had already been broadcast, they can schedule a media conference to play the previously recorded show and comment on the show by utilizing technology such as DVR.

In another embodiment, the a device in the system 500 such as STB 502 can be configured to receive a video stream from one or more of the other devices, such as STBs 502 and 504. Any speech communications taking place at STBs 502 and 504 can be converted into text and the converted text can be presented with the video stream by the STB 502. The conversions can take place at any of the devices in the system 500.

Other suitable modifications can be applied to the present disclosure without departing from the scope of the claims below. Accordingly, the reader is directed to the claims section for a fuller understanding of the breadth and scope of the present disclosure.

Figure 9:
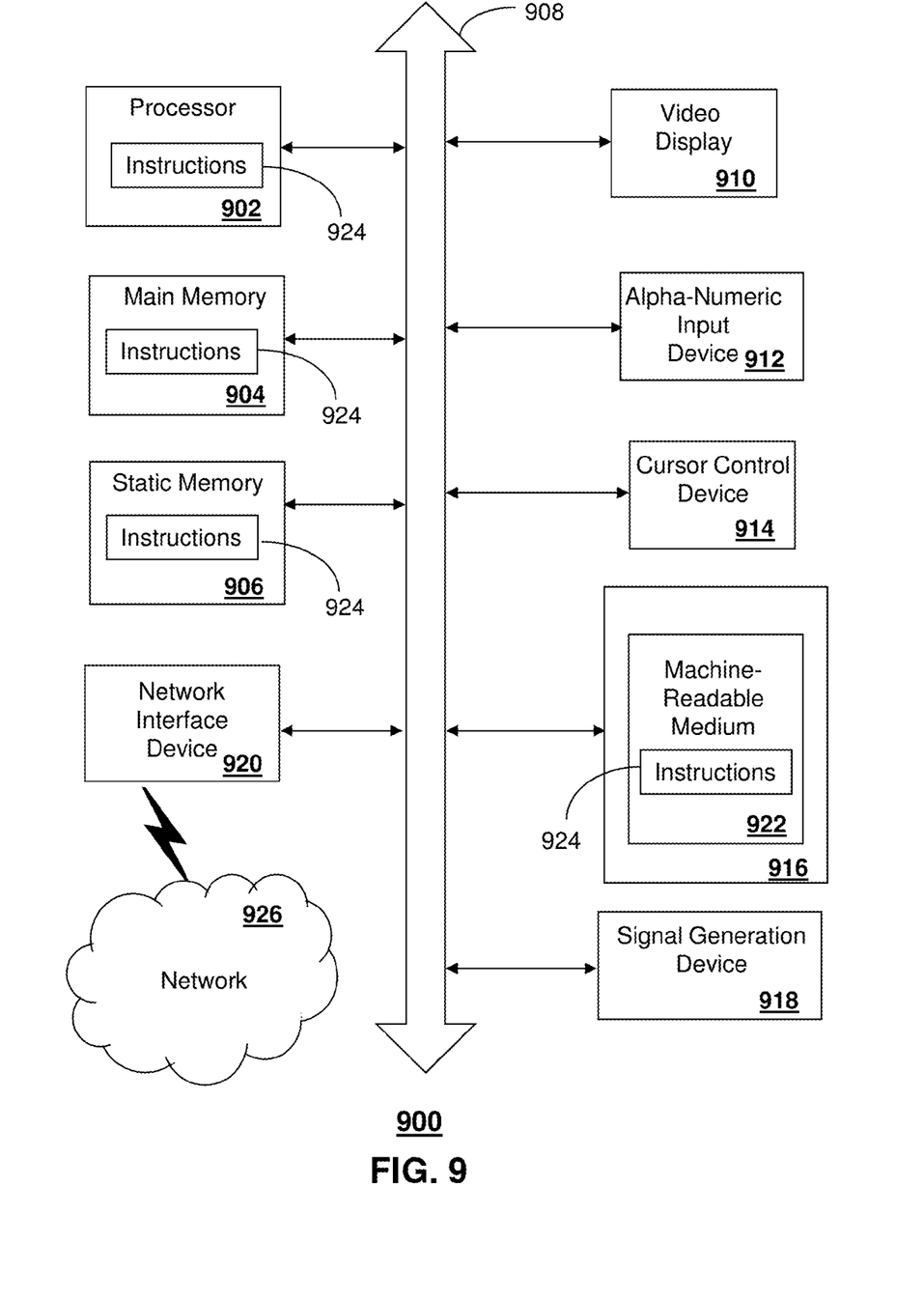
FIG. 9 is a diagrammatic representation of a machine in the form of a computer system within which a set of instructions, when executed, may cause the machine to perform any one or more of the methodologies discussed herein.

FIG. 9 depicts an exemplary diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, a solid state display, or a cathode ray tube (CRT)). The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a machine-readable medium 922 on which is stored one or more sets of instructions (e.g., software 924) embodying any one or more of the methodologies or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   detecting, by a system comprising a processor, from a communication link a plurality of users engaging in a voice conference related to a presentation of a media program;
   converting, by the system, speech dialog of the plurality of users detected in the voice conference to textual dialog of the plurality of users; and
   identifying, by the system, content for distribution to equipment of a user of the plurality of users responsive to the textual dialog of the plurality of users.

2. The method of claim 1, further comprising detecting, by the system, a behavioral pattern from the textual dialog of the plurality of users using a feature selected from a group consisting of: key words; key phrases; statistical modeling; and combinations thereof, wherein the system corresponds to equipment selected from a group consisting of: a set-top box; a communications device; a computing device; central office equipment; and combinations thereof.

3. The method of claim 1, further comprising:
   monitoring, by the system, the media program; and
   identifying, by the system, a media program profile from the media program,
   wherein the identifying, by the system, of the content comprises identifying, by the system, the content for the user of the plurality of users responsive to the textual dialog of the plurality users and the media program profile.

4. The method of claim 3, further comprising:
   submitting, by the system, a message to the equipment of the user of the plurality of users recommending a new program upon completion of the media program, based on the textual dialog of the plurality of users and the media program profile.

5. The method of claim 1, wherein the media program is pre-recorded, and wherein the method further comprises replacing, by the system, existing advertisements presented with the media program with targeted advertisements for distribution to the equipment of the user of the plurality of users based on the textual dialog of the plurality of users.

6. The method of claim 1, further comprising:
   detecting, by the system, a behavioral pattern from the textual dialog of the plurality of users;
   identifying, by the system, previously recorded behavior patterns determined from equipment of the user of the plurality of users; and
   correlating, by the system, the previously recorded behavior patterns with the behavioral pattern to direct the content to the equipment of the user of the plurality of users wherein the content is selected from a group consisting of new advertising content and new media content.

7. The method of claim 6, wherein the behavioral pattern comprises profiling information monitored from the communication link for a trait selected from a group consisting of; biases; opinions; moods; language; personality; demographics; psychographics; and combinations thereof.

8. The method of claim 1, further comprising:
   searching, by the system, a databases for additional content of potential interest; and
   submitting, by the system, to the equipment of the user of the plurality of users a message that recommends the additional content.

9. The method of claim 1, wherein the converting of the speech dialog to the textual dialog of the plurality of users is conducted utilizing a speech-to-text computer program.

10. The method of claim 1, wherein the media program is selected from a group consisting of: of audio content; image content; and a combination thereof.

11. A device, comprising:
    a memory to store computer instructions; and
    a controller coupled with the memory, wherein the controller, responsive to executing the computer instructions, performs operations comprising:
       detecting from a monitored communication session a plurality of users engaging in a discussion with respect to a presentation of a media program;
       determining a textual dialog of the plurality of users indicative of a speech dialog of the plurality of users detected from the monitored communication session; and
       identifying, for distribution to equipment of a user of the plurality of users, content responsive to the textual dialog of the plurality of users.

12. The device of claim 11, wherein the controller further performs operations comprising:
    detecting from the textual dialog of the plurality of users a behavioral profile;
    monitoring the media program;
    identifying a media program profile from the monitored media program; and
    wherein the identifying of the content comprises identifying the content according to the behavioral profile and the media program profile, wherein the content is selected from a group consisting of: advertising content; marketable media content; and combinations thereof.

13. The device of claim 12, wherein the behavioral profile is detected using features selected from a group consisting of: key words; key phrases; statistical modeling; and combinations thereof.

14. The device of claim 12, wherein the controller further performs operations comprising:
    identifying previously recorded behavior patterns; and
    correlating the previously recorded behavior patterns with the behavioral profile to direct one of new advertisements and new content to the equipment of the user of the plurality of users.

15. The device of claim 11, wherein the device is selected from a group consisting of: a set-top box; and an interactive television to invoke the detection of the discussion.

16. A computer-readable storage medium, comprising computer instructions which, when executed by a processor, cause the processor to perform operations comprising:
    detecting from a communication session a voice conference involving among a plurality of users a discussion of a presentation of a media program;
    analyzing textual dialog of the plurality of users derived from the voice conference; and
    identifying, for distribution to equipment of a user of the plurality of users, content responsive to processing of the textual dialog of the plurality of users.

17. The storage medium of claim 16, wherein processing of the textual dialog of the plurality of users comprises detecting features selected from a group consisting of: key words; key phrases; application of statistical modeling; and combinations thereof.

18. The storage medium of claim 16, wherein the processor further performs operations comprising:
    monitoring the media program; and
    identifying a media program profile from the monitored media program;
    wherein the identifying of the content comprises identifying the content responsive to the textual dialogs of the plurality of users and the media program profile, wherein the content is selected from a group consisting of: advertising content; marketable media content; and combinations thereof.

19. The storage medium of claim 16, wherein the processor further performs operations comprising:
    detecting a behavioral pattern from the textual dialog of the plurality of users;
    identifying previously recorded behavior patterns; and
    correlating the previously recorded behavior patterns with the behavioral pattern to direct new content to the equipment of the user of the plurality of users.

20. The storage medium of claim 16, wherein the processor further performs operations comprising:
    searching a content database for additional content of potential interest; and
    submitting to the equipment of the user of the plurality of users a message that recommends the additional content.

* * * * *